Jan. 10, 1933.　　　E. J. SCHAEFER　　　1,894,124
SINGLE PHASE MOTOR
Filed Nov. 11, 1931

Inventor:
Edward J. Schaefer,
by Charles E. Tullar
His Attorney.

Patented Jan. 10, 1933

1,894,124

UNITED STATES PATENT OFFICE

EDWARD J. SCHAEFER, OF FORT WAYNE, INDIANA, ASSIGNOR TO GENERAL ELECTRIC COMPANY, A CORPORATION OF NEW YORK

SINGLE-PHASE MOTOR

Application filed November 11, 1931. Serial No. 574,370.

My invention relates to single phase motors of the type energized from a single phase source but provided with primary windings at an angle to each other in which the currents are out of phase at start. One object of my invention is to provide an arrangement for obtaining out of phase fluxes for starting without providing external phase splitting means. Another object is to provide good starting torque with a low starting current.

In carrying my invention into effect, I provide the motor with primary windings displaced at a suitable angle to each other, one winding being in two sections. For starting, I use the two sections of this primary winding as the primary and secondary of a transformer. The section used as a transformer primary is connected to the source of supply either directly or in series with the other primary winding, and the section used as a transformer secondary is either short-circuited across the other primary winding or on itself. For running, both sections of the primary winding which are on the same axis are energized in parallel from the line. By this means the starting current of the motor is materially reduced and at the same time a desirable phase difference occurs between the currents in the primary windings of the motor because of the transformer action. In this transformer action, the secondary transformer circuit may be considered as the equivalent of a shading coil. No external phase splitting device is required, since the arrangement is such that the primary windings themselves perform the function of the usual phase splitting means during the starting period.

Figure 1:
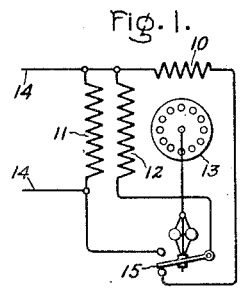
Figure 2:
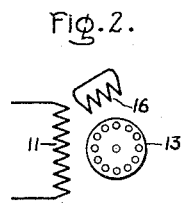
Figure 3:
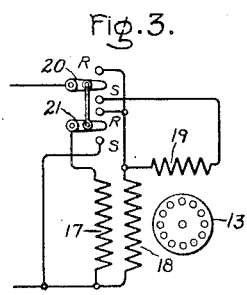

The features of my invention which are believed to be novel and patentable will be pointed out in the claims appended hereto. For a better understanding of the invention, reference is made in the following description to the accompanying drawing, in which Fig. 1 represents a preferred embodiment of my invention; Fig. 2 represents the electrical equivalent of the starting arrangement of Fig. 1; and Fig. 3 is a modification of the invention with switching means for obtaining two different running connections.

Referring now to Fig. 1, I have represented a motor embodying my invention having primary windings 10, 11 and 12 and a secondary member 13 represented as the rotor and provided with a usual form of squirrel cage winding.

Winding sections 11 and 12 are on the same axis and will have an equal number of effective turns so that they may be connected in parallel without causing undesirable circulating currents. Winding sections 11 and 12 may be considered the main winding, and winding 10, displaced by a suitable angle such as 90 electrical degrees, from the main winding, may be considered the starting winding.

In the arrangement of Fig. 1, winding 10 is connected in series with winding section 12 in a closed circuit for starting, and at this time winding section 11, which is connected to the single phase source of supply 14, acts as the primary of a transformer of which winding section 12 is the secondary, and this transformer supplies current to the starting winding 10 as well as a motor flux in its own axis. The transformer action is modified by the presence of the short-circuited secondary 13, in which currents are also induced by the fluxes in the two axes. An automatic speed responsive switch 15 is here provided to change from starting to running condition. The switch is shown in the starting position.

It will be noted that all of the starting current of the motor must flow through main winding section 11, and this is effective in keeping the starting current down to a relatively low value. At the same time a desired phase split between the fluxes in the two axes is obtained by reason of the resultant transformer action and the proper selection of the resistance of winding 10.

I have obtained good results by providing winding 10 with 85 percent of the number of turns of winding section 12 and making the resistance of winding 10 about 2½ times the resistance of winding section 12. Such a motor may be considered as a resistance phase split motor.

Another way of viewing the starting operation is to consider winding section 12 and winding 10 as a shading coil from windng 11. Thus, in Fig. 2 a short-circuited winding 16 is represented, which, if given the proper number of turns and angular displacement, is the equivalent of winding section 12 and 10 of Fig. 1 when connected in series short circuit. Such a winding as shown in Fig. 2 will act as a shading coil for winding 11 and produce starting torque.

After the motor has started, the starting winding 10 is preferably cut out and the two sections 11 and 12 of the main winding are connected in parallel to the line for running operation. Thus, I have provided a single phase motor without external phase splitting means, which has fair starting torque with relatively low starting current. During running the full output of both main winding sections is utilized, so that I have not reduced the running output of the motor from that obtainable with the ordinary conventional motor of the same size. The two winding sections 11 and 12 will have the same number of effective turns as the conventional motor, but will be wound with sizes of wire such that the proper starting current and torques are obtained and such that their combined resistance, when connected in parallel, is equal to that of a conventional motor of the same size. If the windings are so proportioned, the total weight of copper will be no more than that of the single winding of a conventional motor of the same size giving exactly the same running output. With a ¼ horsepower, 110-volt motor having 500 watts running output, I can obtain 100% starting torque with not more than 20 amperes line current with the rotor locked.

In Fig. 3, I have shown another arrangement of the invention. The stator comprises winding sections 17 and 18 on one axis and winding 19 on another axis. At start, windings 18 and 19 are connected in series across the line and section 17 is short-circuited. Sections 18 and 17 now act as the primary and secondary of a transformer. Or we may consider windings 18 and 19 as an equivalent single winding, and winding section 17 as a shading coil therefor. For running operation, winding 19 is cut out and sections 17 and 18 are connected in parallel across the line. Switches 20 and 21 are provided for making the change in connections, S indicating starting connections and R running connections. Here the running conditions are exactly the same as in Fig. 1, whereas the starting connections employ windings 18 and 19 as the primary input circuit, and winding section 17 as a short-circuited transformer secondary, which is the reverse of the starting arrangement shown in Fig. 1, but one which give analogous results.

Figure 4:
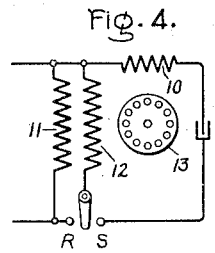

Fig. 4 represents the motor connections of Fig. 1, but with the addition of a condenser in the starting winding circuit to obtain condenser split phase starting. This arrangement also has the advantage of low starting current with full running output obtained by the use of my invention.

Such other modifications as fall within the true spirit and scope of my invention are intended to be covered in the appended claims.

What I claim as new and desire to secure by Letters Patent of the United States, is:—

1. A single phase motor having relatively rotatable primary and secondary members, the primary member having windings disposed at an angle to each other, one of said windings having two sections substantially equal in effective turns, means for connecting said primary windings in primary and secondary circuits, one circuit including one of said sections and the angularly displaced primary winding, and the other circuit including the other of said sections, means for short-circuiting one of said circuits, and means for supplying single-phase energy to the other circuit during the starting period of the motor, at which time the said two winding sections serve as the primary and secondary of a transformer connected between the said circuits, and means for supplying single-phase energy to both of said sections in parallel after the motor has been started.

2. A single phase motor having primary windings disposed at an angle to each other, one winding being made in two sections substantially equal in effective turns, a relatively rotary secondary member, a single phase source of supply, means for connecting one of said sections to said source of supply and connecting the other section in a closed circuit with the angularly disposed primary winding for motor starting purposes, during which time the said two winding sections serve as the primary and secondary of a transformer, and means for connecting both of said sections in parallel to said source of supply for motor running operation.

3. A single phase motor comprising relatively rotatable primary and secondary members, the primary member having two inductively coupled winding sections on one axis and a winding on another axis at an angle to the first mentioned axis, a single phase source of supply, and means for connecting one of said two sections to said source of supply and the other section in closed circuit with the winding on the other axis for starting the motor, and connecting both of said sections in parallel to said source of supply, leaving the other winding open circuited for motor running operation.

4. A single phase motor having primary windings disposed at an angle to each other, one winding being made in two sections, a relatively rotatable secondary member, a single phase source of supply, means for connecting one of said sections in series relation with the angularly disposed winding and to the source of supply, and connecting the other of said sections in a closed circuit for starting the motor, at which time said two winding sections serve as the primary and secondary of a transformer, and means for connecting both of said winding sections in parallel to said source of supply for motor running operation.

5. A single phase motor comprising angularly disposed primary windings, one of which is made in two inductively coupled sections, a relatively rotatable secondary member, a single phase source of supply, means for connecting one of said winding sections to said source of supply, and the other section in a closed circuit including the angularly displaced primary winding for starting the motor, a condenser included in said closed circuit, and means for connecting both of said primary winding sections in parallel to said source of supply for running.

In witness whereof, I hereunto set my hand.

EDWARD J. SCHAEFER.